INVENTORS
EDWARD F. FITZHUGH, JR.
DON C. SEIDEL
Walter J. Monacelli
ATTORNEY

INVENTORS
EDWARD F. FITZHUGH, JR.
DON C. SEIDEL
Walter J. Monacelli
ATTORNEY

United States Patent Office 3,510,273
Patented May 5, 1970

3,510,273
RECOVERY OF MOLYBDENUM, VANADIUM AND URANIUM FROM SOLUTIONS OF CORRESPONDING SALTS
Edward F. Fitzhugh, Jr., Cleveland Heights, Ohio, and Don C. Seidel, Golden, Colo., assignors to Republic Steel Corporation, Cleveland, Ohio, a corporation of New Jersey
Filed Apr. 6, 1967, Ser. No. 628,914
Int. Cl. C01g 43/02, 31/00, 39/00
U.S. Cl. 23—321                    14 Claims

ABSTRACT OF THE DISCLOSURE

This invention comprises a method for the recovery of molybdenum, vanadium and/or uranium from aqueous solutions containing one or more of the corresponding salts. These metals are recovered in an oxidic form, namely an oxide or hydroxide, by the addition of metallic iron to the solution under controlled conditions of temperature, pH, and amount of iron.

---

This invention relates to the recovery of molybdenum, vanadium and/or uranium from solutions containing one or more of the corresponding salts. More specifically, it relates to a process for precipitation of such metal or metals in the form of oxides or hydroxides by the addition of metallic iron to a solution of such a metallic salt or salts. Still more particularly, this invention relates to a process for such precipitation of the metallic oxide or hydroxide by the addition of metallic iron under specific temperature and acid conditions.

Molybdenum, vanadium and uranium are found in certain ores, or in the tailings from ores from which other metals have been leached or otherwise recovered. In some cases waste leach solutions are available which contain one or more of these metals in relatively small amounts. In view of the low percentage of such metals in particular ores or because of the low concentration of such metals in leach solutions, it is very often not profitable to recover such values. However, the recovery of such metals from ores and leach solutions would be of considerable interest if an inexpensive, simple method was available for economical recovery of such metal values.

In accordance with the practice of this invention, it has now been found that molybdenum, vanadium and/or uranium can be recovered either together or individually from solutions of the same by the addition of controlled amounts of metallic iron at appropriate temperatures and acid conditions. By such conditions, the molybdenum, vanadium and/or uranium is precipitated in an oxide or hydroxide form, hereinafter referred to generically as "oxidic" form. The valence of the particular metal in the respective precipitated forms varies according to the metal.

In general, a ratio of at least one mole of metallic iron per mole of Mo, V and/or U contained in the solution, advantageously 2–6 moles of iron per mole of said metal or metals, preferably 2–3.5 moles of iron per mole of Mo or V and preferably 3–6 moles of iron per mole of uranium, effects precipitation of the desired metal oxidic compound. Excessive amounts of iron are not desirable, since the excess iron produces a lower grade of recovered metal oxide. Reference is made to moles of iron per mole of Mo or other metal. Since this ratio is calculated on the basis of metal in the metallic state regardless of the respective metals being in compound form, this is the same as saying atoms of iron per atom of Mo, V or U.

The solution of the metal salt advantageously has a pH at the start in the range of 1.4–1.6. The use of a more acidic solution means merely that more iron is dissolved by the solution into the desired pH range for effective precipitation. A higher pH in the starting solution will not defeat the precipitation of the desired metallic oxide or hydroxide but is less advantageous in that insufficient iron is sometimes dissolved to effect the maximum precipitation of the desired metallic oxides or hydroxides. Moreover, the use of a higher initial pH generally results in a somewhat lower product grade. In any case, the initial pH should not be greater than 5, preferably no greater than 3.5.

In general, the final pH, or pH after precipitation of the metallic compound, is in the range of about 2.5–5.

For the purpose of precipitating the desired oxidic metal in accordance with this invention, the temperature is advantageously at least 100° C., advantageously in the range of 100–200° C., and preferably 115–150° C. While the temperature can be even higher than 200° C., there is no advantage in exceeding this temperature and unnecessary heating costs are introduced. At temperatures below 100° C., the precipitation is much less effective in that a lower percentage of the contained metal is thereby precipitated.

The process of this invention is effected in a closed vessel for several reasons. First, the reaction is desirably maintained under pressure to avoid vaporization and thereby to permit the higher temperatures desired. Secondly, hydrogen is generated by the reaction of the iron with acid in the solution and it is found most advantageous to retain this hydrogen in contact with the solution in order to produce the most effective results. If the hydrogen is allowed to escape, the precipitation is less efficient than in cases where a partial pressure of hydrogen is maintained.

Where molybdenum, vanadium or uranium is to be recovered from an ore, it is desirable that the ore be one naturally oxidized to facilitate the leaching necessary to put the metal compound into solution. In precipitating the respective metals from the acid leach solution in accordance with this invention, it is found that a reduction in the valency is effected so that the precipitated oxide has the respective metal in a lower valence form than it originally had in the solution. In general, although the exact oxide or hydroxide form of the respective metals has not been determined, it is believed that the molybdenum and uranium are in the 4-valency form and the vanadium is in a lower valency form than the starting 5 or 4 valency.

In preparing such solutions it is generally desirable to leach the ores by treatment with sulfuric acid after they have been reduced to finely divided form. This is performed according to known techniques for treatment or recovery of various metals from various ores by acid leaching.

The presence of phosphates in the metal salt solutions reduces the efficiencies of the iron precipitations according to this invention and, therefore, ores and solutions therefrom containing phosphates are to be avoided, unless some method is effected to remove the phosphates from solution or to counteract the effect of phosphates before treatment according to this process. In some cases the bad effect of phosphates can be counteracted by the use of larger amounts of iron. It is advantageous to have a phosphate content of less than 5%, calculated as $P_2O_5$, in the solution and preferably less than 1% $P_2O_5$ content.

The precipitated product can be used as such for various purposes where utilization can be effected of the metal in its oxide or hydroxide form, or the metal can be further processed according to known techniques for recovering it in metallic form.

In accordance with this invention, the respective metals can be substantially completely recovered from their solutions, with recoveries of 90-99% being relatively easily effected.

In the drawings, FIG. 1 is a curve plotted to show the effect of temperature on percent recovery of Mo using the conditions described hereinafter in Example II.

Figure 1:
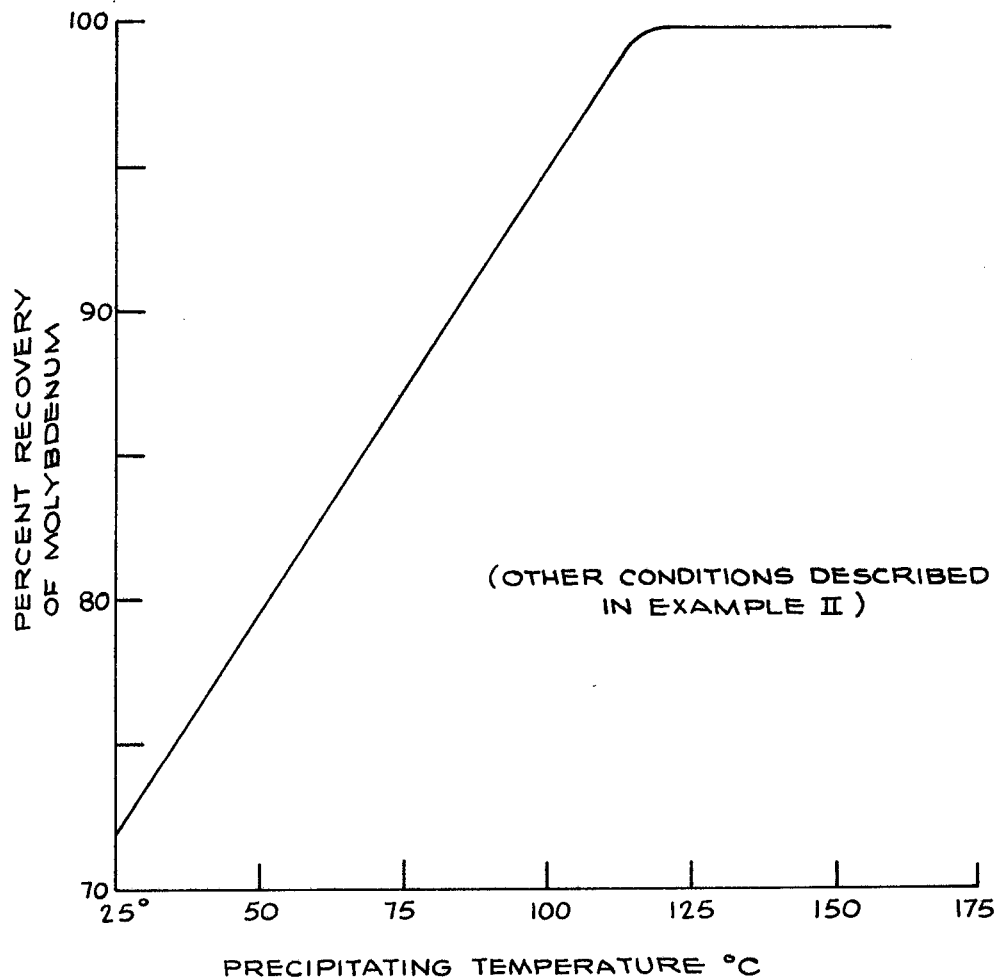

The particle size of the iron used has an effect in that the reaction between iron and the salt solution is a surface reaction. Therefore, all other facts being equal, the production rate generally increases with smaller particle size because of the greater area presented. Reaction takes place even with large particles of iron but at a slower rate. An advantageous particle size is found to be less than 100 mesh. In addition to the particle size, there are other characteristics, such as purity and carbon content of the iron which affect reaction rate. Low carbon iron powder is preferred for this purpose.

Where it may be desirable to have a purer grade of metallic oxide precipitated, it may be preferred to add less than the amount of iron that will effect complete precipitation of the desired metal values in the solution. In such case, the filtrate after removal of the initial precipitate, can be further treated with iron to effect more complete removal of the desired metallic values. However, the second precipitate will be of much poorer grade than the first precipitate because of the excess iron which is undissolved in the solution.

Although leaching with sulfuric acid is generally desired, it is also possible to practice the process of this invention on solutions which contain the respective metals in the form of chlorides or nitrates. As previously indicated, the amount of iron used is dependent on the concentration of the respective metals in the salt solution.

The invention is best described by the following examples. These examples are presented merely for purpose of illustration and are not intended in any way to limit the scope of the invention, nor the manner in which it can be practiced. Unless specifically indicated otherwise, parts and percentages are given by weight. In the following examples, the experiments are performed in a 2-liter autoclave reactor made of 316 stainless steel and having a double impellor. The reactor is a standard one commercially available as Parr 2-L Reactor 316 SS. The recovery of the precipitate is facilitated by using a glass liner, but the reactor solution can be directly in contact with the stainless steel. It is often desirable to bleed some of the steam from the reactor at an early stage to sweep out the initially contained air and hereby provide a more reducing atmosphere.

EXAMPLE I

One liter of an acidic sulfate solution having a pH of 1.6 and containing 2 grams/liter of Mo (as molybdic ion, $Mo^{+6}$) is placed in a 2-liter autoclave as described above. To this starting solution 3.49 grams of finely divided low carbon iron is added. This iron addition is equivalent to about 3 moles of Fe for each mole of Mo in solution. The autoclave is closed and, with sufficient agitation to keep the iron powder in suspension, the temperature is raised to and maintained at approximately 150° C. for 60 minutes. The resultant solids are recovered by filtration to give a molybdenum-iron powder having a molybdenum content of 31.4% Mo with the balance primarily iron and combined oxygen. The molybdenum precipitated represents 99.8% of the molybdenum in the original solution.

EXAMPLE II

To illustrate the critical effect of temperature in the process of this invention, a series of experiments are performer using the procedure of Example I. In each test the procedure is the same as that for Example I except that the reaction temperature is different in each case, having the respective values of 25° C., 80° C., 100° C., 122.5° C., 135° C., 150° C. and 160 C. The relationship obtained between the molybdenum recovery and the precipitation temperature is shown in the curve of FIG. 1. As will be noted, the optimum recoveries are achieved at temperatures above 100° C.

EXAMPLE III

Figure 2:
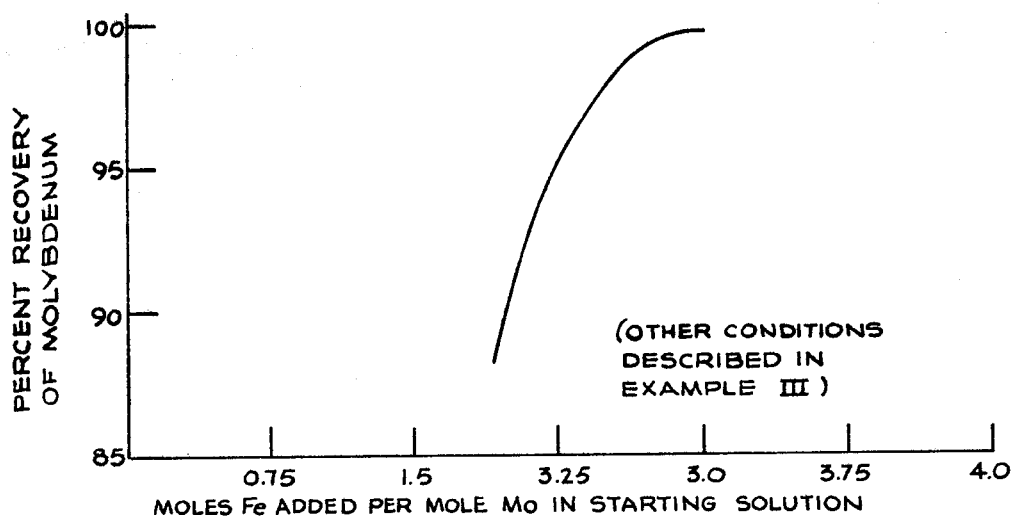
FIG. 2 is a curve plotted to show the effect of variations in the Fe to Mo ratio on the percent recovery of Mo, using conditions described in Example III.

To illustrate the effect of the amount of iron added, a series of experiments are performed using the procedure of Example I. In each test the starting solution contains 2 grams/liter of Mo., the starting pH is 1.6, the reaction temperature is approximately 150° C., and the reaction time is 60 minutes. In these tests, the iron addition is varied using 1.8, 1.95, 2.25, 2.7 and 3.0 moles of Fe respectively per mole of Mo in solution. The realtionship obtained between molybdenum recovery and iron addition is shown by the curve of FIG. 2. The curve illustrates that for these particular conditions the recovery approaches 100% as the iron addition approaches 3 moles of Fe for each mole of Mo in the starting solution.

EXAMPLE IV

One liter of acidic vanadyl sulfate solution having a pH of 1.5 and containing the equivalent of 2 grams/liter $V_2O_5$ (1.12 grams/liter V) is placed in a 2-liter autoclave as described above. To this starting solution 3.69 grams of finely divided low carbon iron is added. This iron addition is equivalent to 3 moles of iron for each mole of vanadium in solution. The autoclave is closed and with sufficient agitation to keep the iron powder in suspension, the temperature is raised to and maintained at approximately 150° C. for 60 minutes. The resultant solids are recovered by filtrating to give a vanadium-iron powder having a vanadium content of 51.2% V with the balance being primarily iron and combined oxygen. The vanadium precipitate represents 99.6% of the vanadium in the original solution.

EXAMPLE V

Figure 3:
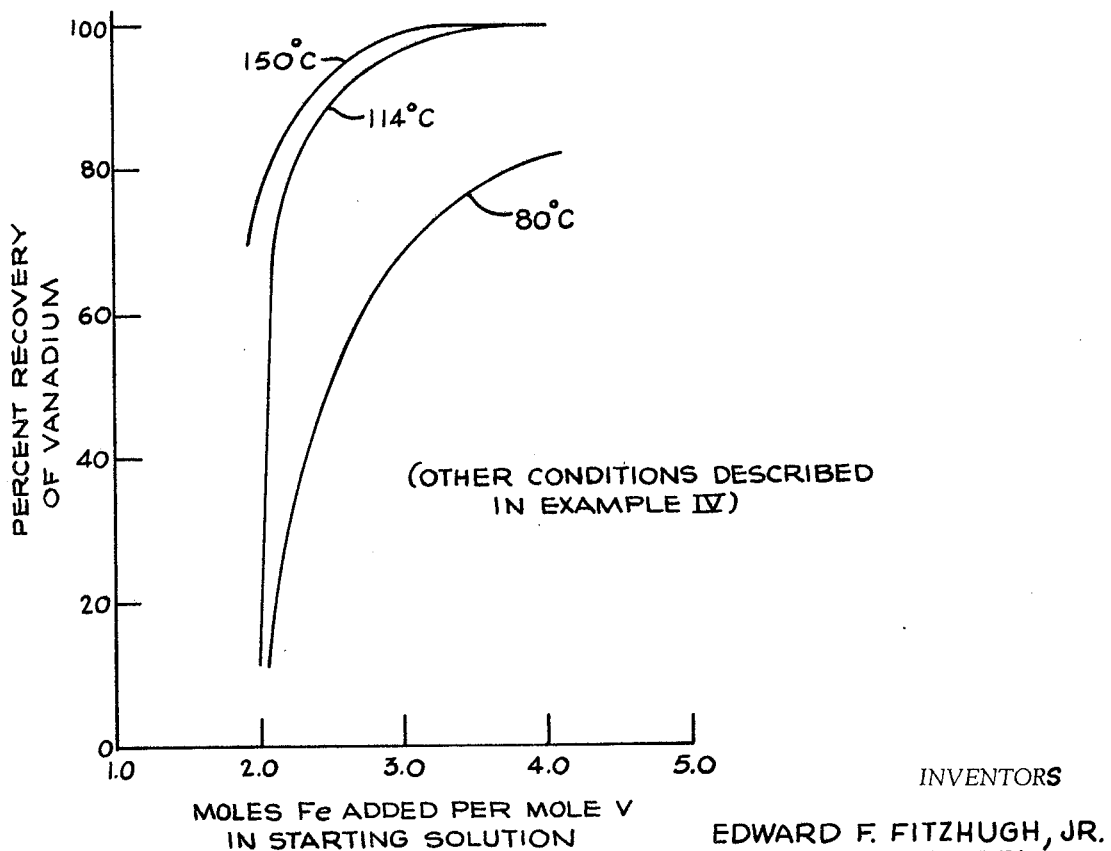
FIG. 3 is a curve plotted to show how variations in the Fe to V ratio affect the percent recovery of V, using conditions described in Example V.

To illustrate the effect of temperature and the amount of iron added to precipitate vanadium, a series of tests is performed using the procedure of Example IV. In each test the starting solution contains 2 grams/liter of $V_2O_5$, the starting pH is 1.5, and the reaction time is 60 minutes. In these tests, the iron addition is varied in respective tests from about 2.0 to 4.0 moles of iron per mole of vanadium in solution. Reaction temperatures of 80° C., 114° C., and 150° C. are used. The relationship obtained between vanadium recovery and iron addition at each of the three respective temperatures is shown by the three curves in FIG. 3. The recoveries at 114° C. and 150° C. are shown to be significantly better than those obtained at 80° C. The curves for the 114° C. and 150° C. reaction temperatures also illustrate that for this starting solution, the recovery approaches 100% as the iron addition approaches 3 moles of Fe for each mole of V in solution.

EXAMPLE VI

One liter of an acidic uranyl sulfate solution having a pH of 1.5 and containing the equivalent of 2 grams/liter of $U_3O_8$ (1.7 grams/liter U) is placed in a 2-liter autoclave as described above. To this starting solution 2.24 grams of finely divided low carbon iron is added. This iron addition is equivalent to 5.6 moles of Fe for each mole of uranium in solution. The autoclave is closed and with sufficient agitation to keep the iron powder in suspension the temperature is raised to and maintained at approximately 150° C. for 60 minutes. The resultant solids are recovered by filtration to give a uranium content of 56.8% with the balance primarily iron and combined oxygen. The uranium precipitated represents 96.8% of the uranium in the original solution.

EXAMPLE VII

The procedure of Example I is repeated except that the starting solution contains a mixture of bolybdenum, vanadium and uranium salts. The molybdenum content is 1.79 grams per liter of Mo. The vanadium content is 2.16 grams per liter of $V_2O_5$, and the uranium content is 1.68 grams per liter of $U_3O_8$ (1.42 grams per liter of U). A liter of this solution is used and the starting pH is adjusted to 1.6. The powdered iron addition is 3.49 grams which is equivalent to approximately 1.30 moles of Fe per combined moles of Mo, V and U. The resulting precipitate which is recovered by filtration contains 16.7 percent Mo, 24.7 percent $V_2O_5$ and 22.2 percent $U_3O_8$. The molybdenum recovery is 78.6 percent, the vanadium recovery is 91.2 percent, and the uranium recovery is 93.3 percent of the starting compositions.

When larger amounts of iron are added, the percent recoveries are increased.

EXAMPLE VIII

The procedures of Examples I–VII are repeated satisfactorily using in place of the various metal salts described therein, the corresponding chloride and nitrate salts respectively.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process for the separation in oxide or hydroxide form of a metal selected from the class consisting of molybdenum, vanadium and uranium, from an aqueous acidic solution selected from the class consisting of sulfuric, hydrochloric and nitric acid, having a pH no greater than 5 and containing at least one salt of said metal selected from the class consisting of sulfate, chloride and nitrate, comprising the steps of:
   (a) adding metallic iron to said solution;
   (b) maintaining a temperature of at least 100° C.;
   (c) continuing the resultant reaction until a major amount of said oxidic metal compound has been precipitated from said solution; and
   (d) thereafter separating said precipitate from said solution.

2. The process of claim 1 in which said temperature is in the range of 115° C. to 150° C.

3. The process of claim 1 in which said salts are the sulfate salts.

4. The process of claim 1 in which said salts are the chloride salts.

5. The process of claim 1 in which said salts are the nitrate salts.

6. The process of claim 1 in which said acidic solution has a pH no greater than 3.5.

7. The process of claim 1 in which said iron is in a finely divided state.

8. The process of claim 7 in which said iron is added in an amount of at least one mole per mole of said metals contained in said solution.

9. The process of claim 7 in which said salt is a molybdenum salt and said iron is used in an amount of 2–3.5 moles per mole of said molybdenum in said solution.

10. The process of claim 9 in which said temperature is in the range of 115° C. to 150° C.

11. The process of claim 7 in which said salt is a vanadium salt and said iron is used in an amount of 2–3.5 moles per mole of said vanadium in said solution.

12. The process of claim 11 in which said temperature is in the range of 115° C. to 150° C.

13. The process of claim 7 in which said salt is a uranium salt and said iron is used in an amount of 3–6 moles per mole of said uranium in said solution.

14. The process of claim 13 in which said temperature is in the range of 115° C. to 150° C.

References Cited

UNITED STATES PATENTS 2,841,465    7/1958    Porter _____ 23—333

CARL D. QUARFORTH, Primary Examiner

M. J. McGREAL, Assistant Examiner

U.S. Cl. X.R.

23—19, 23, 328, 333, 336

UNITED STATES PATENT OFFICE
CERTIFICATE OF CORRECTION

Patent No. 3,510,273            Dated May 5, 1970

Inventor(s) E. F. Fitzhugh et al

It is certified that error appears in the above-identified patent and that said Letters Patent are hereby corrected as shown below:

In Column 4, Lines 5-6, "performer" should read --- performed ---;

In Column 5, Line 7, "bolybdenum" should read --- molybdenum ---;

Add to list of references cited:
--- 2,780,519    2/1957    Kaufman et al
--- 2,797,143    6/1957    Arendale et al
--- 2,866,680    12/1958    R. S. Long ---

SIGNED AND SEALED
NOV 10 1970

(SEAL)
Attest:

Edward M. Fletcher, Jr.
Attesting Officer

WILLIAM E. SCHUYLER, JR.
Commissioner of Patents